(12) United States Patent
Dulin

(10) Patent No.: US 8,827,237 B2
(45) Date of Patent: Sep. 9, 2014

(54) METERED FILL VALVE

(75) Inventor: Robert Dulin, Kingsbury, TX (US)

(73) Assignee: Baker Products, Ltd., Kingsbury, TX (US)

( * ) Notice: Subject to any disclaimer, the term of this patent is extended or adjusted under 35 U.S.C. 154(b) by 649 days.

(21) Appl. No.: 13/100,716

(22) Filed: May 4, 2011

(65) Prior Publication Data

US 2011/0272037 A1    Nov. 10, 2011

Related U.S. Application Data

(60) Provisional application No. 61/331,656, filed on May 5, 2010.

(51) Int. Cl.
*G05D 11/00* (2006.01)

(52) U.S. Cl.
USPC .................................. 251/38; 251/41; 251/58

(58) Field of Classification Search
CPC .......... F16K 31/363; F16K 21/12; E03D 3/04
USPC .................................... 251/25, 33, 38, 41, 58
See application file for complete search history.

(56) References Cited

U.S. PATENT DOCUMENTS

| 4,662,602 A | 5/1987 | Johnson |
| RE32,880 E | 2/1989 | Lapeyre |
| 4,843,657 A | 7/1989 | Orr |
| 7,171,702 B2 | 2/2007 | Shaw |
| 7,661,438 B2 | 2/2010 | Nichols-Roy et al. |

*Primary Examiner* — Craig Schneider
(74) *Attorney, Agent, or Firm* — Jackson Walker, LLP

(57) ABSTRACT

A fluid flow valve is disclosed which includes a fluid flow assembly, a piston diaphragm assembly, and a reset plunger pin assembly. These three assemblies are configured to engage one another such that, when used in conjunction with a pressurized water source, they will split the pressurized water source into two portions, the one portion defining a main fluid flow pathway through the valve and, a much smaller proportion, defining a metered fluid flow pathway through the valve. The piston diaphragm assembly has a diaphragm or other equivalent structure for defining a metered fluid flow chamber, which metered fluid flow chamber is fluidly engaged to a pressurized water source through a metering channel in a piston. A reset plunger meter pin assembly engages the metered fluid flow or piston chamber of the piston diaphragm assembly and can initiate a timed flow of water or other fluid into the metered fluid flow chamber, which timed flow controls the flow of fluid or water flowing through the fill valve.

22 Claims, 23 Drawing Sheets

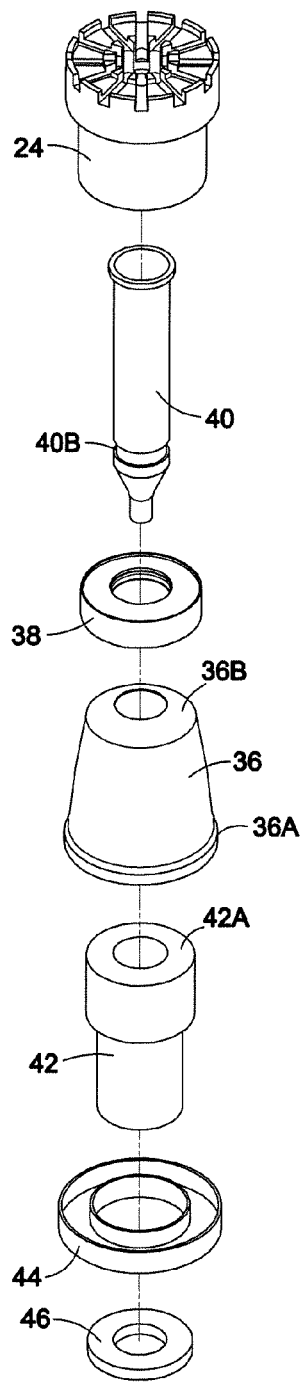
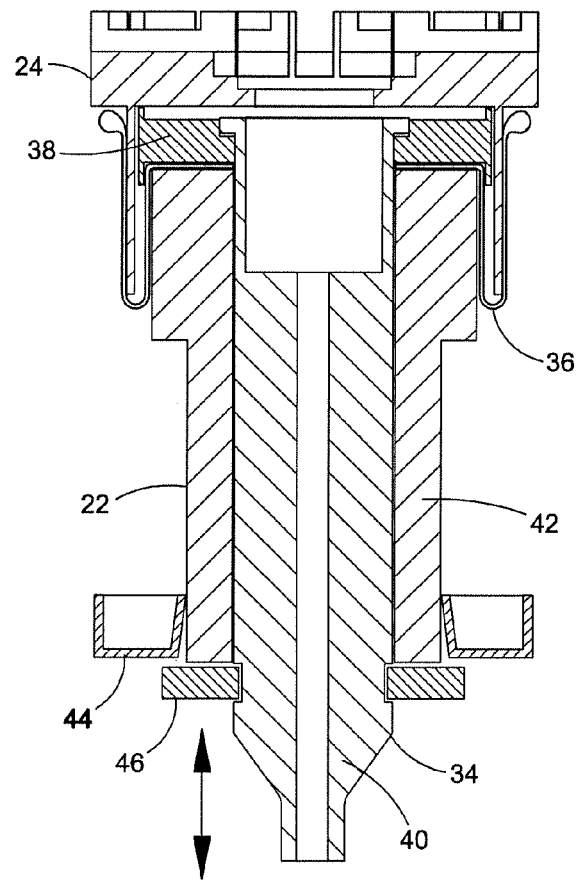
Fig. 5a
Fig. 5b

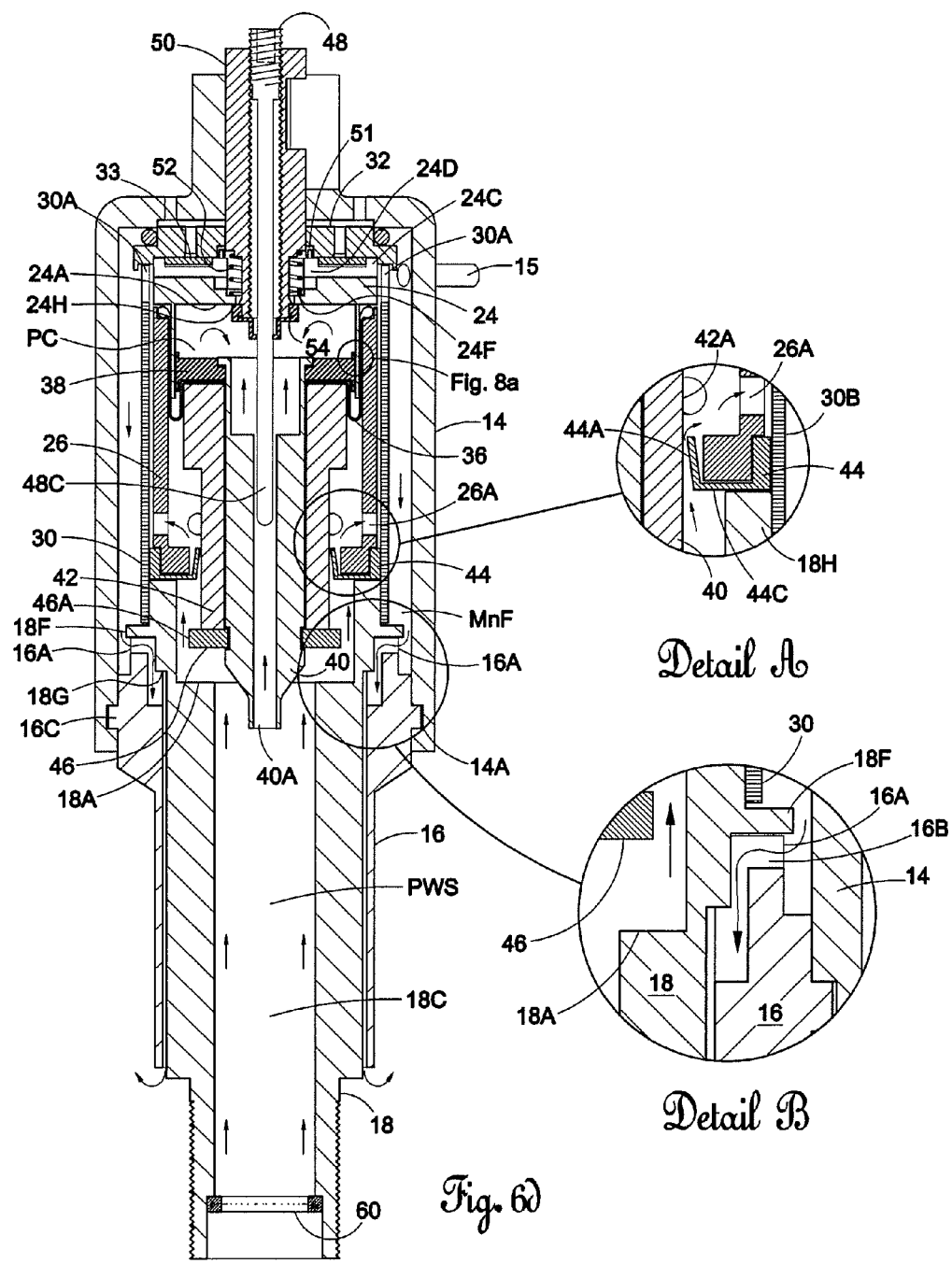

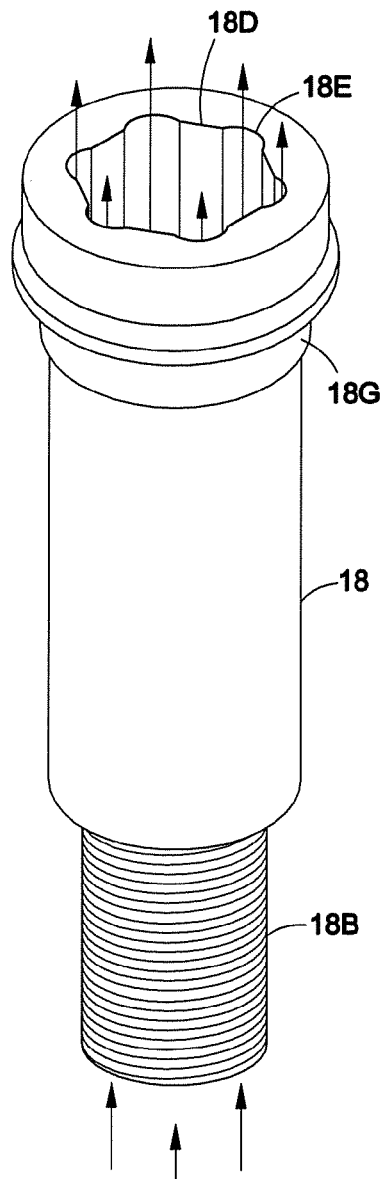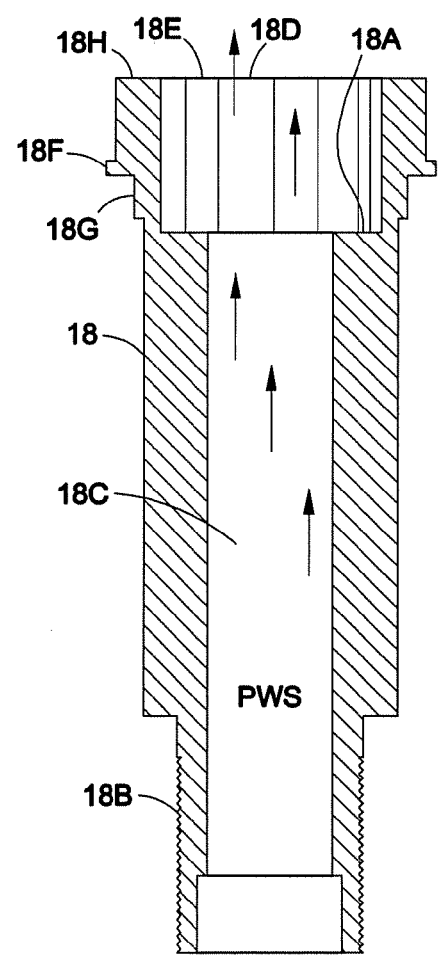
Fig. 14a
Fig. 14b

METERED FILL VALVE

This application claims the benefit of and incorporates by reference U.S. Patent Application No. 61/331,656, filed May 5, 2010.

FIELD OF THE INVENTION

Fill valves, namely, a metered fill valve.

BACKGROUND OF THE INVENTION

Fill valves are typically used to fill a container with a pre-selected quantity or volume of a fluid, typically a liquid. Fill valves, for example, may be used in toilets to fill the tank that provides water for flushing the commode. Fill valves also have a number of other uses, including automatic faucet turn-off, metered liquid dispensers, manually reset flow limiters, timers, etc.

SUMMARY OF THE INVENTION

Applicant provides a metered fill valve, wherein a pressurized water source engaged to the metered fill valve provides an adjustable, metered flow of water or other fluid to a volume metering chamber which, when it fills, will begin a timed cycle of metered main flow to refill a tank or other receptacle. Applicant further provides this fill valve with a main water flow pathway having a fluid pressure responsive annulus area, and a two position main flow stop.

BRIEF DESCRIPTION OF THE DRAWINGS

FIG. 5a is an exploded perspective top side view of the piston diaphragm assembly engaging the inner housing upper member.

FIG. 5b illustrates the piston diaphragm assembly in cross-section.

FIGS. 6a, 6b, 6c, and 6d illustrate cross sectional views showing elements of the valve as assembled and conditions of Applicant's metered fill valve as it controls the flow of metering water and the main flow of water therethrough in various positions.

FIGS. 14a and 14b are side, upper perspective, and side cross sectional views of inlet channel member.

DETAILED DESCRIPTION OF THE PREFERRED EMBODIMENTS

FIGS. 1-4 illustrate a metered fill valve assembly (sometimes "valve assembly") 10 including lever 56 used in the holding tank of a commode. A flush handle FH mounted on the tank is seen to engage and actuate a flush lever FL mounted in the tank, and also lever 56. Applicant's metered fill valve assembly may adjust the flow of the water from a pressurized water source PWS such as a water supply line. In metering the flow from PWS to the holding tank, with the use of Applicant's novel metering fill valve, water volume from the pressurized water source PWS to the tank may be accurately controlled. That is to say, Applicant may adjust valve assembly 10 to provide for a small amount of water in the holding tank or a large amount of water in the holding tank or selectively set the amount of water in the holding tank between these extremes. The metering of the water flow between PWS and the tank is selectively set by the user for a desired tank volume. Moreover, the metering of the flow between an ON and OFF position (ON, PWS flowing into the tank bowl; OFF, PWS shut) uses the actual pressure of the PWS along with a biasing member 44 to control the time that it takes to fill a metered diaphragm or piston cavity PC volume, which is then used to control the flow of water into the tank.

Turning now to FIGS. 3, 4, and 6a-6e, the various modes of operation will be discussed. Recall that the function of this valve is to dispense water or other fluid under pressure in a manner that can control the volume of fluid expelled from valve assembly 10. Moreover, the volume of liquid can be controlled by simple adjustment of the valve assembly.

Figure 6A:
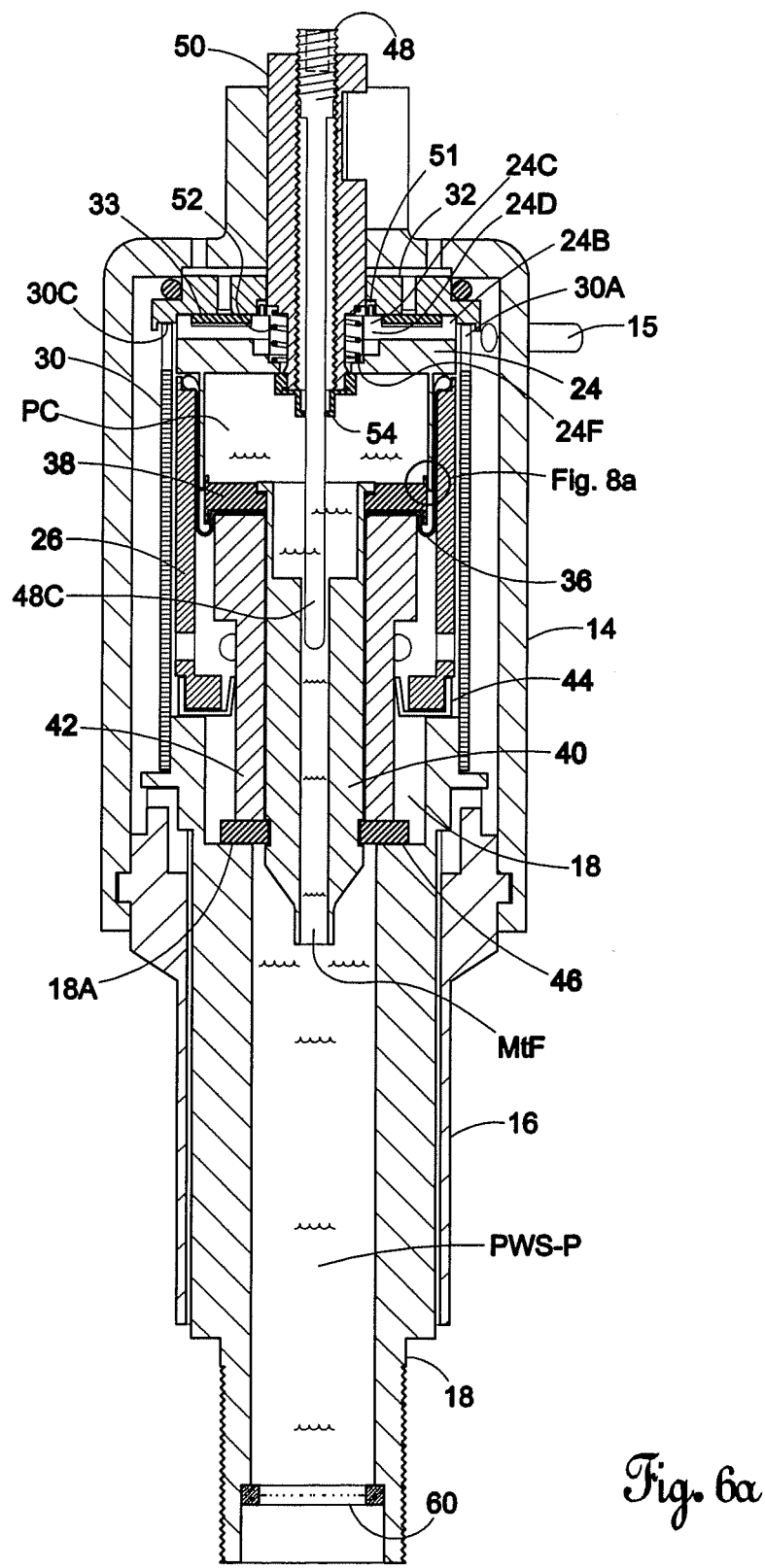

FIG. 6a may be referred to as the "ready state." In this condition, the commode bowl has been filled, it can be seen that there is no flow of fluid through the valve, no flow of fluid into a metered flow or piston chamber PC (that is to say, no metered flow MTF), and no flow past main seal 46 (that is to say, no main flow MNF). The parts of valve assembly 10 are not moving. Reset outlet/metered pin seal 54 prevents the pressurized fluid in piston chamber PC from escaping therefrom. In the ready condition as illustrated in FIG. 6a, fluid pressure on piston cap 38 urges piston diaphragm assembly 22 (see FIG. 8a) down, thus urging main seal 46 against lower main seal seat 18a of inlet channel member 18. Note that the area of piston cap 38 and exposed area of the piston core 40 is greater than the exposed area of the seal 46 and the lower end of piston core 40 and, the pressure trying to unseat seal 46 being the same as the pressure pushing down, the net effect will be for the pressurized water source PWS to maintain the seal of (that is, preventing) the main flow MNF as illustrated in FIG. 6a.

Figure 6B:
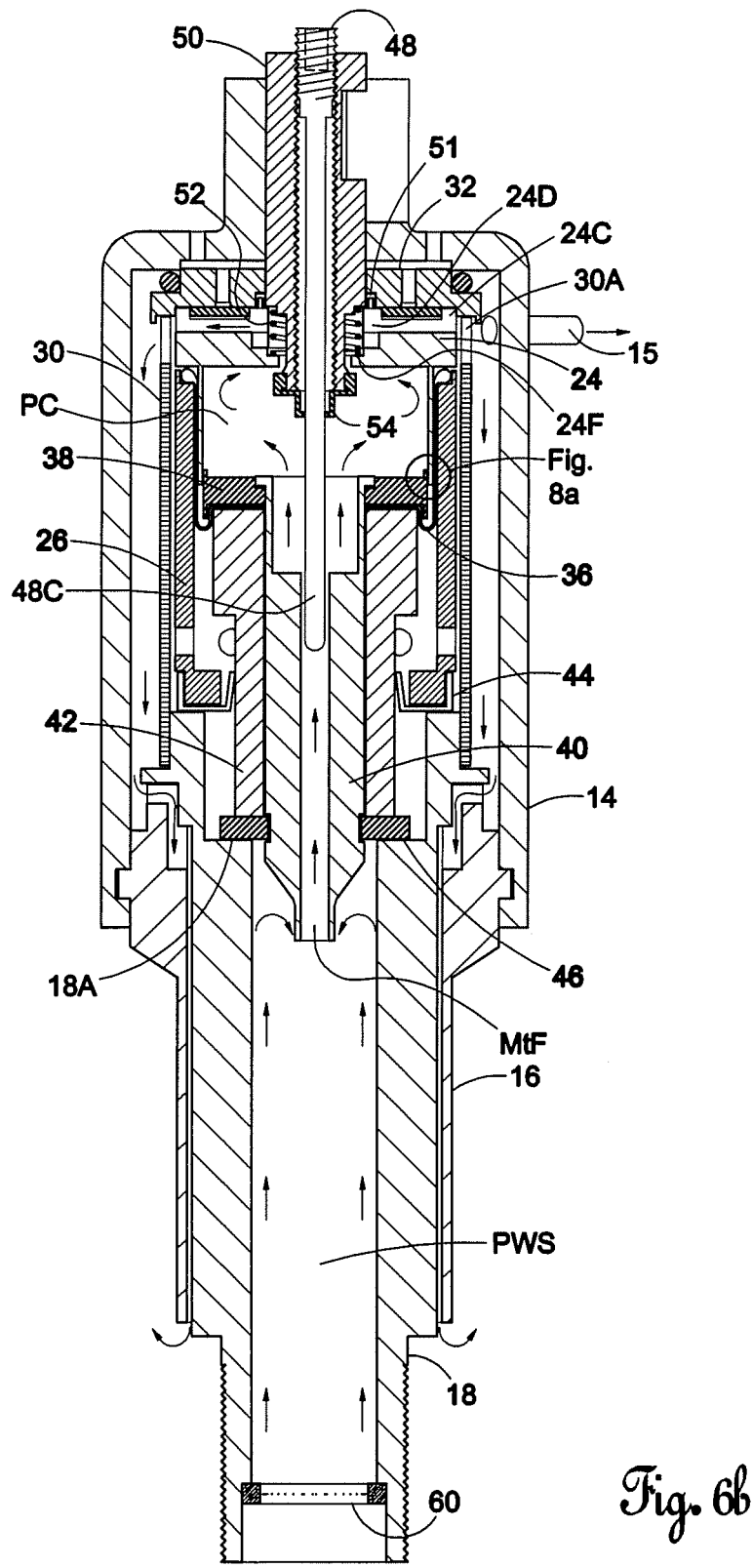

It can be seen, however, that the instant plunger 50 is urged downward from the position as illustrated in FIG. 6a, seal 54 will be broken and fluid can escape through inner housing upper member 24 and out the assembly as illustrated in FIG. 6b. Note, however, that the plunger down, piston chamber emptying condition illustrated in FIG. 6b is just a momentary condition for expelling the metering fluid in piston chamber PC. Moreover, when there is a sufficient pressure drop in piston chamber PC, then seal 46 will unseat and diaphragm piston assembly 22 will begin to raise, which will unseat seal 46 off lower main seal seat 18a. Quickly in just a second or so diaphragm assembly 22 will move to the position illustrated in FIG. 6c.

To review, FIG. 6a provides for the valve in a ready-to-flush position with no fluid flowing therethrough at all. The instant the lever 56 is raised and, therefore, plunger 50 urged downward, seal 54 is broken and there is a rapid emptying of the piston chamber with the resultant movement of the piston diaphragm assembly upward to the position seen in FIG. 6c.

Figure 6C:
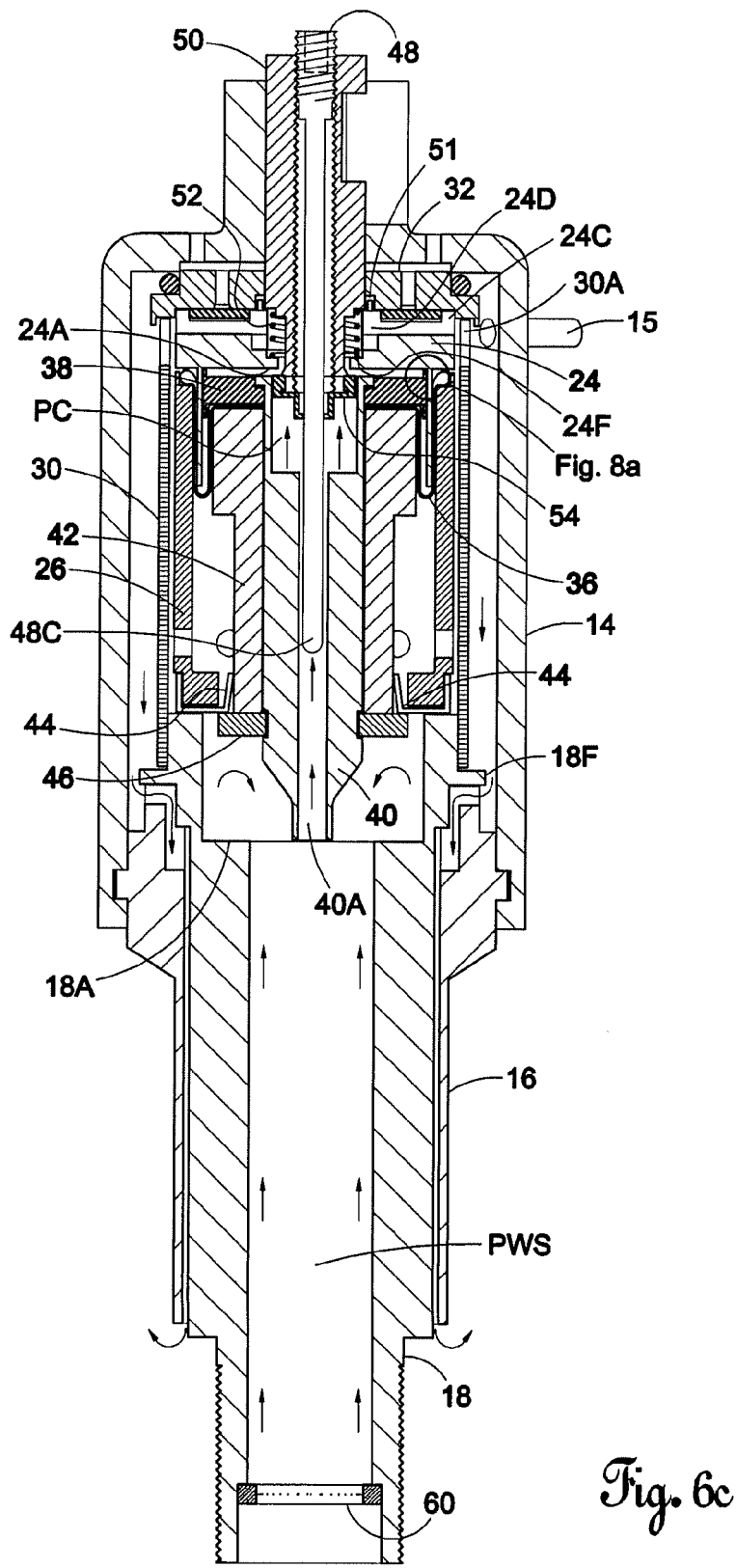

In FIG. 6c, this condition is momentary also, as it may be seen that metered flow MTF through metering channel 40a in piston core 40 will immediately begin filling piston chamber PC, the plunger 50 having been released and moved up and, therefore, seating seal 54 against the underside of inner housing upper member 24, namely, at seat 24a thereof.

Figure 6E:
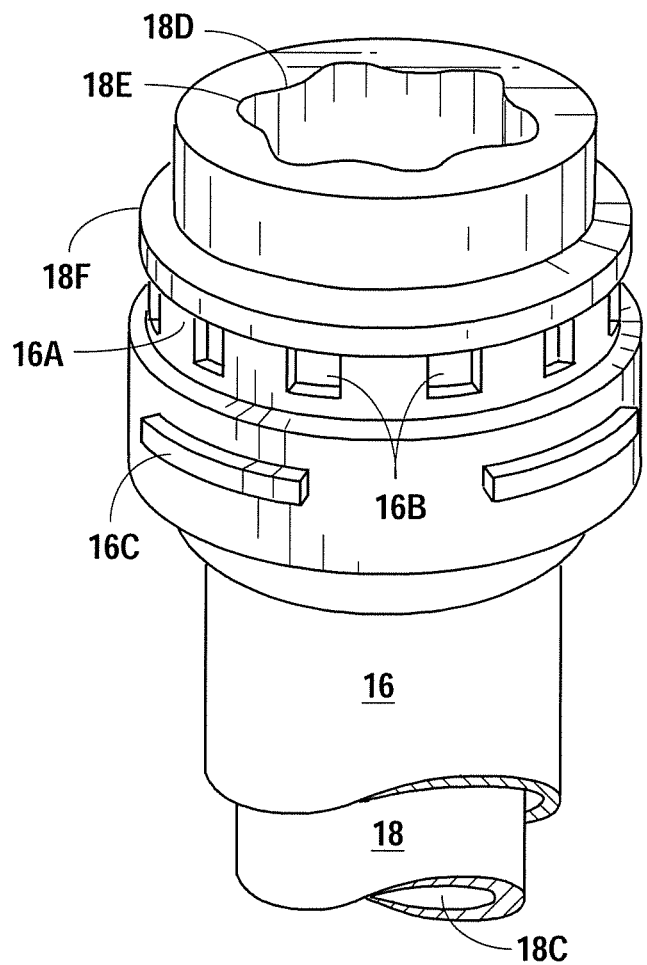
FIG. 6e is a perspective view of the manner in which elements 16 and 18 engage and how water may flow through them.

Turning now to FIG. 6d, the main filling position of the valve, it will be seen that there are two types of flow pathways into the valve and one flow pathway out of the valve. FIG. 6d illustrates the valve in the position where it is actively filling a container, such as the holding tank and bowl of a toilet. Further, it can be seen in FIG. 6d that metering flow MTF is occurring in channel 40a and into metered flow or piston chamber PC. However, since seal 54 is sealing the piston chamber (plunger 50 having been released) that, as the piston chamber PC fills with metering flow, piston diaphragm assembly 22 and the piston are moving downward as shown by the arrows, and main seal 46 is approaching lower main seal seat 18a. One can see also main fluid flow (MNF) as it progresses past main seal 46 and through or past biasing member 44. In Detail A illustration of FIG. 6d one can see that flap 44a of biasing member 44 is lifted, by fluid pressure, slightly off outer surface 42a of piston sleeve 42. Following main fluid flow MNF it is seen that there is nowhere for the flow to go except through holes 26a along the lower edge of inner housing lower member 26 and up the annulus created between inner housing lower member 26 and intermediate housing 30. Moving up through the annulus, there is nowhere else to go except through openings or slots 30a of the upper perimeter of intermediate housing 30. Following its passage through slots 30a, it is seen that water can now proceed through the annulus or gap between the outer wall of intermediate housing 30 and the inner wall of upper housing section 14 as seen in Detail B of FIG. 6d. It is noted in FIG. 6d that there is a fluid tight connection between the lower end of upper housing section 14 and lower housing section 16, but a channel is provided for main fluid flow MNF to exit metered fill valve assembly 10 (and enter the holding tank) in an annulus between the inner walls of lower housing section 16 and the outer walls of inlet channel member 18 as seen in FIG. 6d. FIG. 6e illustrates another view of main flow MNF moving up channel 18c of inlet channel member 18. Fluid flow is seen passing through bays 16b (see also FIG. 6d, Detail B). This fluid will pass through the annulus between elements 16 and 18, and fill the holding tank. Some of the main fluid flow MNF may leave valve assembly 10 through bowl refill outlet 15, which may be connected to an overflow pipe in the tank to help refill the toilet bowl.

With a general understanding of the operation as provided above, further details and functions of Applicant's novel metered fill valve assembly 10 may be appreciated with reference to the specifications as set forth more fully below.

Figure 8A:
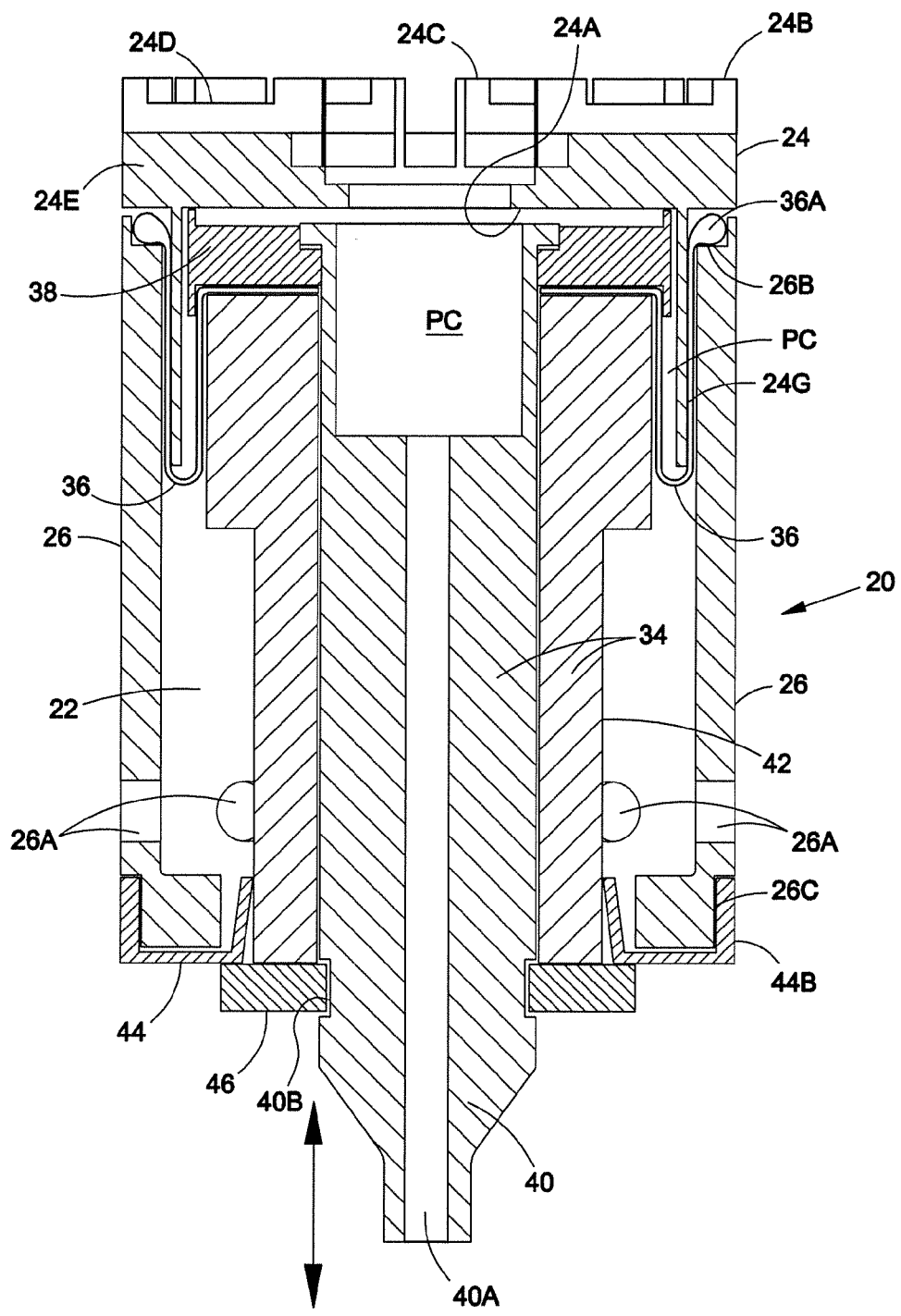
FIG. 8a is a cross sectional view of Applicant's piston chamber assembly apart from the rest of the metered fill valve.

Turning now to FIGS. 3, 4, 8a, 10a and 10b, it is seen that a piston chamber assembly 20 includes a piston diaphragm assembly 22, inner housing lower member 26, inner housing upper member 24, and biasing member 44. Piston diaphragm assembly 22 includes piston cap 38, piston sleeve 42, piston core 40, seal 46, and diaphragm 36. Inner housing upper member 24 is seen to engage inner housing lower member 26, which in turn engages biasing member 44 to provide a chamber that will serve several functions. First, the large chamber defined by the foregoing elements 24/26/44 is seen to provide a chamber in which piston diaphragm assembly 22 can move up and down as illustrated in FIG. 8a, and as explained with reference to FIGS. 6a-6d. In FIG. 8a, the piston chamber PC is almost empty and the metering cycle, which is shown at the very beginning in FIG. 6c and at a mid-point in FIG. 6d, can begin. Note that there are two moving parts in applicant's device—a reset plunger meter pin assembly 28 to initiate the MNF and meter the MTF and the movement of the piston diaphragm assembly 22 for shutting off the main flow MNF after a metered amount of water has filled the piston chamber PC and seated seal 46 of seat 18a.

Details of the manner in which Applicant's inner housing upper member 24 engages an intermediate housing cap 32 and upper housing section 14 may be appreciated with reference to FIGS. 3, 6d, 8a, 10a, and 10b. FIGS. 3, 4, 6A, and 6B show how intermediate housing cap 36 lies between upper housing section 14 (above) and inner housing upper member 24 (below). This structure is designed to achieve a number of functions, including providing a path for metered fluid in piston chamber PC to empty from the piston chamber PC and out as set forth above with reference to FIG. 6b. Inner housing upper member 24 includes: reset plunger seal seat 24a; outer uprights 24b; inner uprights 24c; channels 24d; and bays 24e. Outer and inner uprights 24b/24c are seen in FIG. 6a. These provide a seat for vacuum breaker disc 33 as seen in FIG. 6a. The underside of intermediate housing cap 32 is urged downward by engagement with the upper housing section 14, downward meaning urged against the upper perimeter or edge of intermediate housing 30c. Channels 24d (see FIG. 10a) are created between bays 24e and adjacent inner and outer uprights to expel metering fluid as set forth above into the annulus and downward between intermediate housing 30 and upper housing section 14 (see FIG. 6b). Moreover, inner housing upper member 24 is seen to have a recess 24f therein for receiving spring 52 therein (see FIG. 6d).

Inner housing upper member 24 is further seen to have a cylindrical thin-sided skirt 24g extending downward therefrom for sandwiching diaphragm 36 against the inner wall of inner housing lower member 26 as seen in FIG. 8a. This skirt 24g helps prevent diaphragm 36 from wrinkling or otherwise deforming during movement of the piston diaphragm assembly 20.

With further reference to FIG. 8a, it is seen that diaphragm 36 has an outer bead 36a for receipt into upper recess 26b in inner housing lower member 26. Diaphragm 36 is usually made with an elastomeric flexible rubber, rubber-like material or other suitable material. Bead 36a helps provide a fluid tight seal especially when the underside of inner housing upper member 24 sits against the bead as seen in FIG. 8a.

With reference to FIG. 8a, inner housing lower member 26 is seen to have a lower recess 26c for receipt of leg 44b of biasing member 44. The other structure that can be appreciated with reference to FIG. 8a is piston diaphragm assembly 22. Piston diaphragm assembly 22 may include a piston 34, which may be comprised of piston core 40 received tightly within a piston sleeve 42 to which is tightly fitted a piston cap 38. Piston core 40 is seen to have metering channel 40a therein for carrying metering fluid from the pressurized water source PWS, here typically connected to the lower end of inlet channel member 18. While piston diaphragm assembly 22 is seen here to be comprised of separate members, it is possible to make them from a single member or several members with the diaphragm separate from the unitary elements 34/36/38/40/46 or any number of other structures to serve the same functions. FIG. 8a also illustrates notch 40b for carrying main seal 46 therein, such that main seal 46 moves with and may be seen to be part of piston diaphragm assembly 22.

Figure 1:
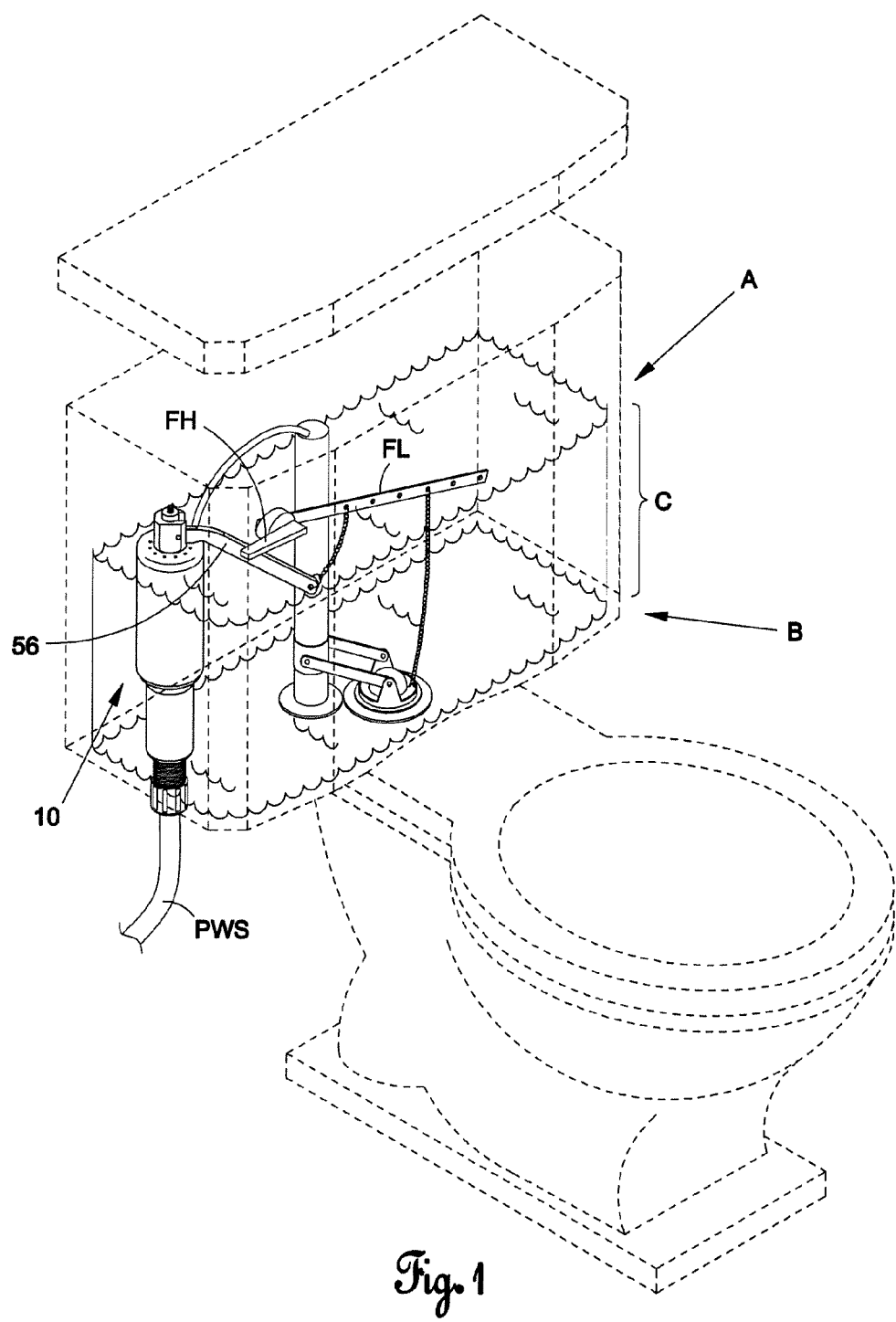
FIG. 1 is a perspective view of the front left-side of a toilet having Applicant's novel metered fill valve engaged therewith illustrating a toilet holding tank being full at line A, substantially empty at line B, and filling or emptying between lines A and B, in the area designated C.
Figure 2:
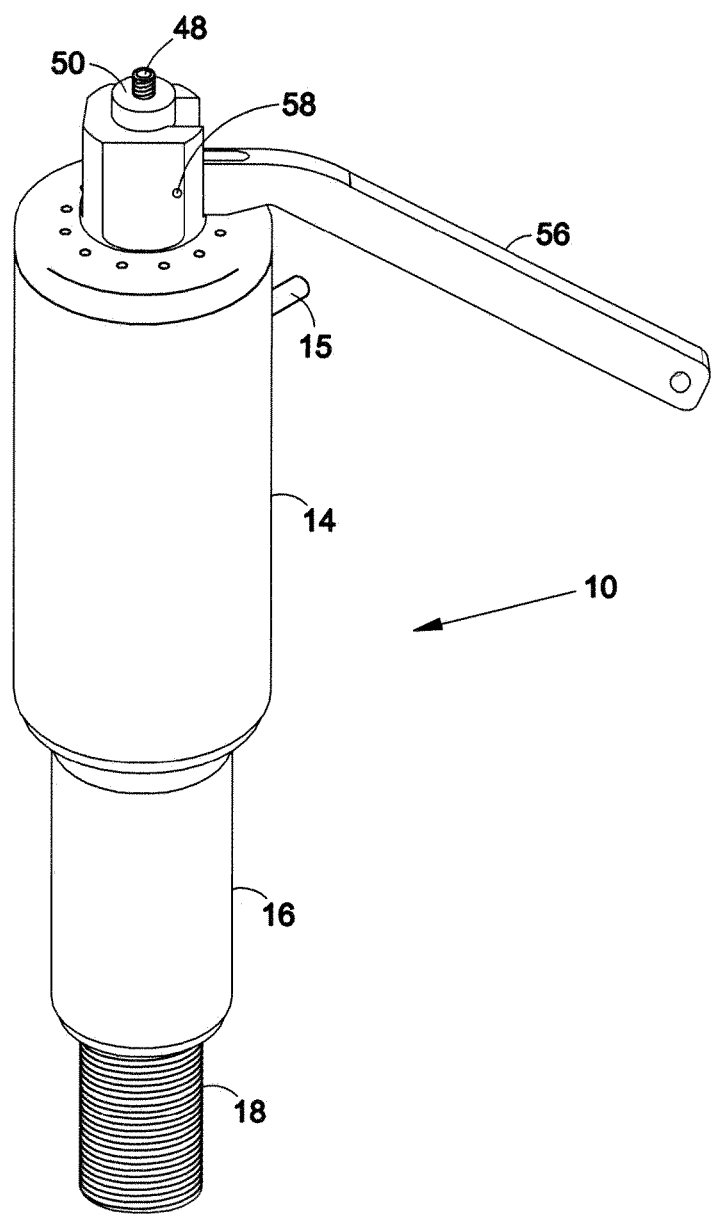
FIG. 2 is a perspective exterior view of Applicant's metered fill valve as assembled and having a lever engaged therewith.
Figure 3:
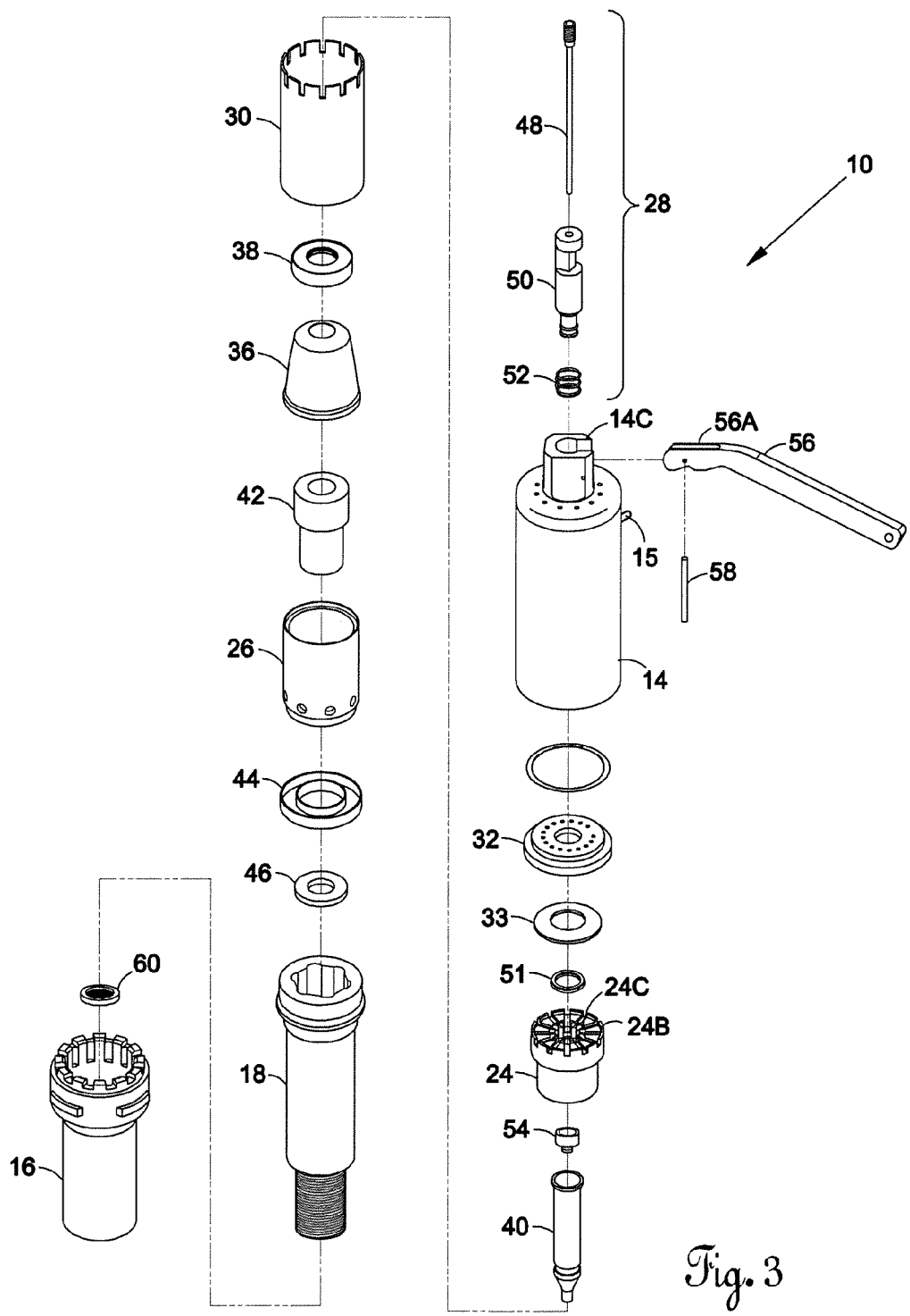
FIG. 3 is an exploded perspective view of Applicant's metered fill valve viewed from the top left side.
Figure 4:
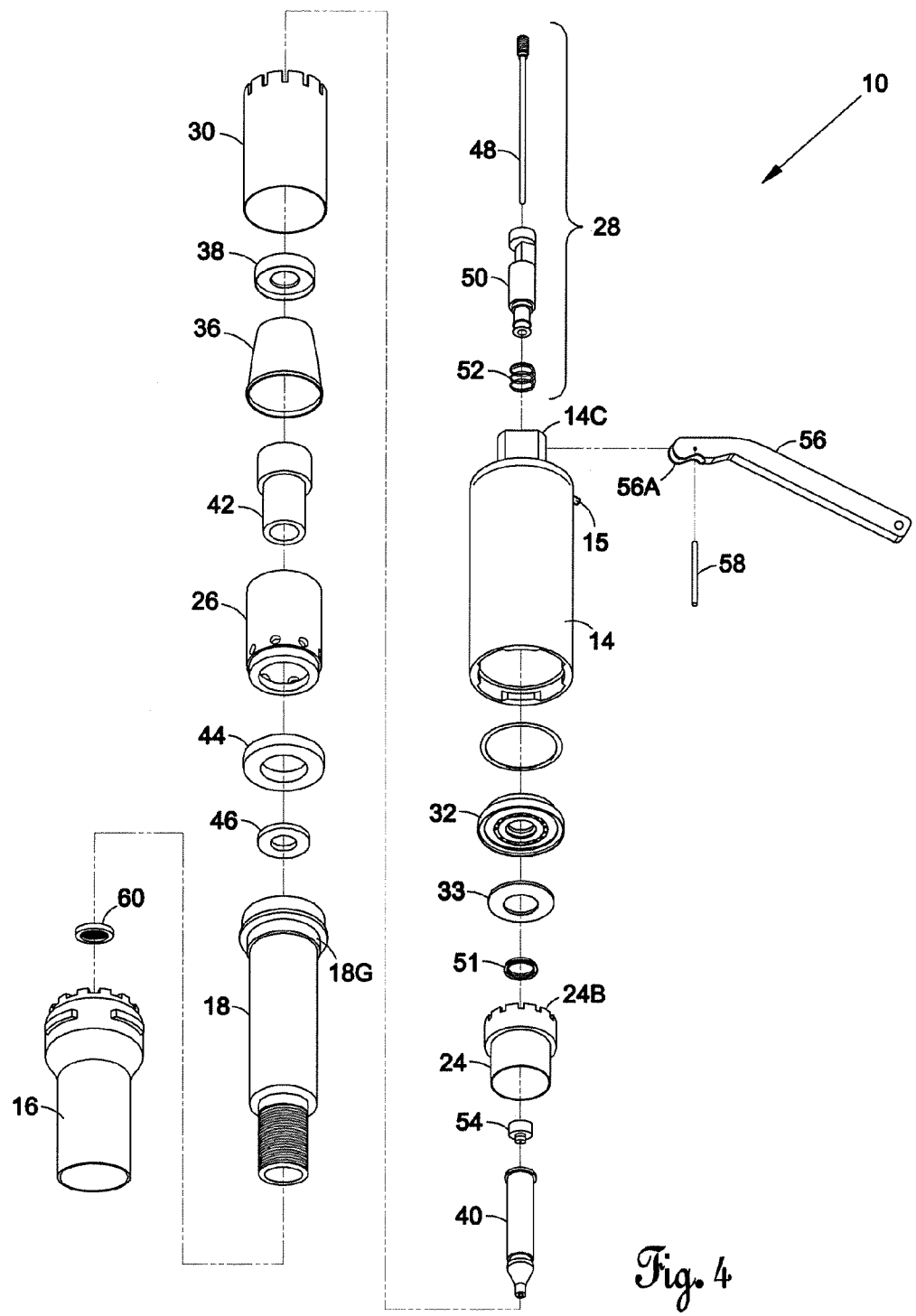
FIG. 4 is an exploded perspective view of Applicant's metered fill valve viewed from the bottom right side.
Figure 8B:
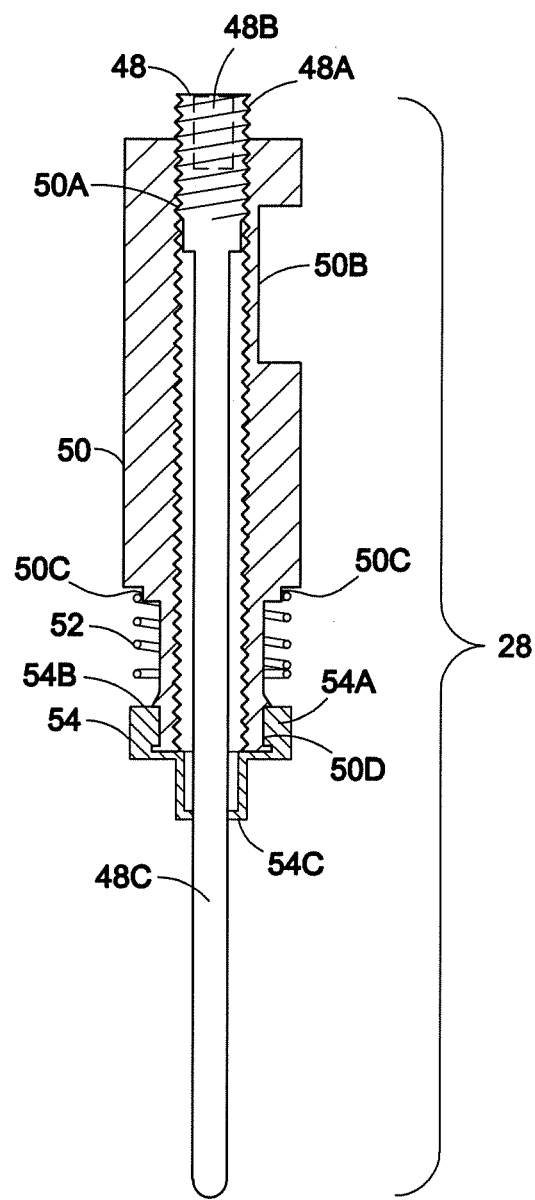
FIG. 8b is an exploded cross sectional view of the reset plunger meter pin assembly.
Figure 9A:
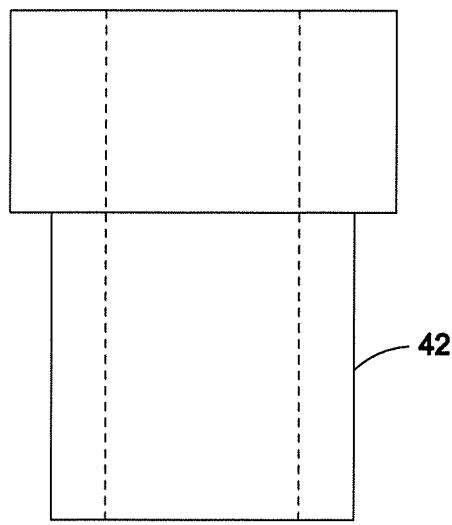
FIGS. 9a and 9b are exterior side elevational and cross sectional views of the piston sleeve.
Figure 9B:
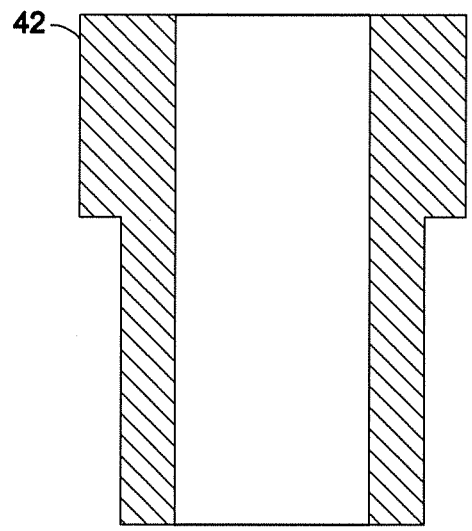
Figure 10A:
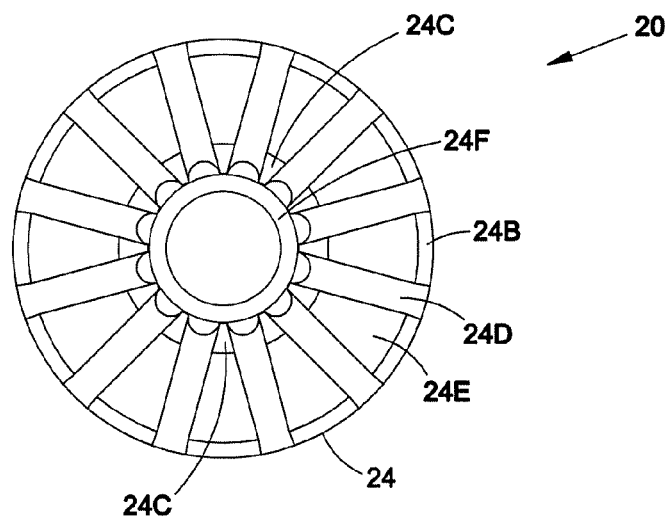
FIGS. 10a and 10b are top elevational and side cross sectional views of the inner housing upper member.
Figure 10B:
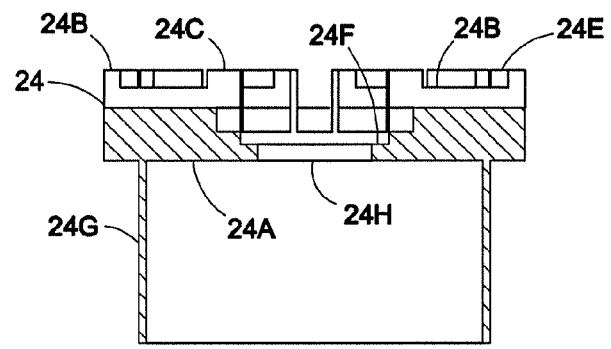

Turning now to FIGS. 3, 4, and 8b, the structure and function of reset plunger meter pin assembly 28 may be appreciated. Plunger 50 is seen to include an inner threaded section 50a for threadable receipt of the meter pin 48 therein. Meter pin 48 has a threaded section 48a that is designed to threadably engage threaded section 50a of plunger 50. Metering pin 48 may also have, at a near end thereof, adjusting tool receiving cutout 48b for receiving a tool so that pin 48 may be rotated with respect to plunger 50. Manual adjustment will cause pin 48 to move axially along reset plunger 50. Plunger 50 may have a lever receiving cutout 50b near the upper end thereof for receipt of a lever 56 as seen in FIG. 3. Spring shoulder 50c may also be provided near a removed end of plunger 50 for receipt of spring 52 there into.

Metering pin 48 is also seen to have an elongated or lower portion 48c as seen in FIG. 8b, and also as seen in the "Series 6" figures, for example, FIG. 6a, which lower portion 48c typically extends at least partially into channel 40a of piston diaphragm assembly 22. In such a position, lower portion will restrict the flow of fluid in channel 40a as it is urged towards piston chamber PC. Typically, a gap of 1 to 10 mil (that is, 1 thousandth to 10 thousands of an inch), for example, between the walls of channel 40a and lower portion 48c may be provided. During fabrication, this may be adjusted according to need. The distance lower portion 48c extends into channel 40a is adjustable. Moreover, it can be seen that moving downward or moving upward metering pin 48 will alter the extent to which lower portion 48c extends into channel 40a. This adjustment—the extent to which lower portion 48c extends into channel 40a—is what will meter the flow from PWS through channel 40a and into piston chamber PC. The less the metering pin 48 extends into the channel 40a, the faster the piston chamber will fill and the quicker it will cause seal 46 to shut off main flow MNF. On the other hand, extending metering pin 48 far into channel 40a will provide a slower filling and a longer period of time that the main seal 46 remains unseated, and therefore will provide more fluid entering whatever container is being filled, be it a commode, tank or any other container. Putting threads or roughening outer surface of either pin 48 or channel 40a or both will slow the filling of piston chamber PC. Moreover, piston 40 will slide with respect to pin 48 during a normal timed cycle and, thus, will clean the channel 40a of debris and the like.

In FIG. 8b, plunger 50 is seen to include a seal receiving cutout 50d dimensioned to receive tightly thereon skirt 54a of reset outlet/meter pin seal 54. As can be seen in FIG. 8b, reset outlet/meter pin seal 54 sits tightly in cutout 50d against the removed end of plunger 50, so that as plunger 50 moves downward in response to moving the lever or handle of a commode, seal 54 will unseat and open the piston chamber as seen in FIG. 6b. Further, it is seen with reference to any of the "Series 6" figures that the removed end of plunger 50 is located within hole 24h of inner housing upper member 24, such that there is plenty of room for fluid to flow between the lower end of the plunger and the walls defining hole 24h. Another structure and dimension that may be appreciated with reference to the "Series 6" figures and FIG. 8b is that the width of upper surface 54b of reset outlet/meter pin seal 54 is dimensioned to extend out far enough to engage and cover seat 24a when the piston diaphragm assembly is in the positions illustrated in FIGS. 6a, 6c, and 6d.

Reset outlet/meter pin seal 54 also has a pin seal portion 54c, which rides against meter pin 48 when the meter pin is being adjusted up or down, but is sufficient to prevent fluid under pressure in the piston chamber PC from finding its way up and out between the inner channel of the plunger 50 and the metering pin 48. Thus, reset outlet/meter pin seal 54 prevents fluid from leaking out past the metering pin 48 and out the inner bore of plunger 50.

Figure 7:
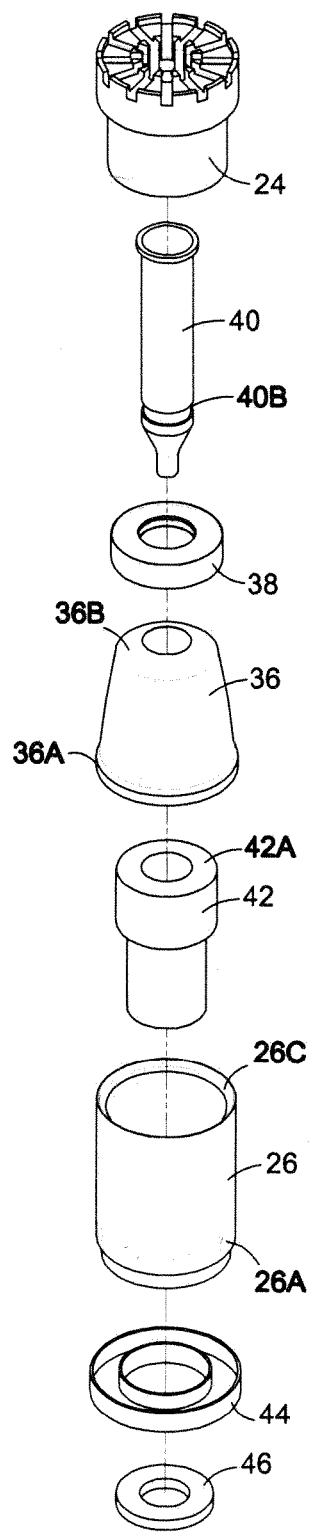
FIG. 7 is an exploded perspective view of the piston chamber assembly.

Turning back to FIGS. 3, 4, and 7, additional structure may be appreciated. It is seen, for instance, how piston cap 38 is dimensioned to slide over diaphragm inner skirt 36b to wedge or jam and seal skirt 36b against an upper surface 42a of piston sleeve 42 as can be seen, also, in FIG. 8a. It is also seen with reference to FIGS. 7 and 8a how bead 36a of diaphragm 36 sits in upper recess 26b. Other suitable methods of sealing the diaphragm 36 may be used.

Turning now to FIGS. 11a, 11b, 12a, and 12b, these are seen to illustrate structure of intermediate housing 30 and intermediate housing cap 32. The position of these two elements with respect to one another and with respect to the upper housing section 14 and the piston chamber assembly 20 may be further appreciated with respect to the "Series 6" figures. It is seen, for example, that slots 30a are provided for the flow of the metering fluid MTF out through hole 24h across through channels 24d, the top of inner housing upper member 24, and out the slots 30a. It is also seen how removed end 30b seats snugly on upper end 18h of inlet channel member 18 (see Detail A, FIG. 6d). Intermediate housing cap 32 is seen to include recess 32a on an underside thereof for loose receipt of vacuum breaker disc 33 thereonto. Vent holes 32b are provided for venting if there is need for a vacuum break as set forth in more detail below. Seal cutout 32c is provided for receipt of plunger seal 51 thereinto as seen, for example, in FIG. 6a. Hole 32d is dimensioned for slideable engagement with plunger 50 therethrough as seen in FIG. 6a.

Figure 11A:
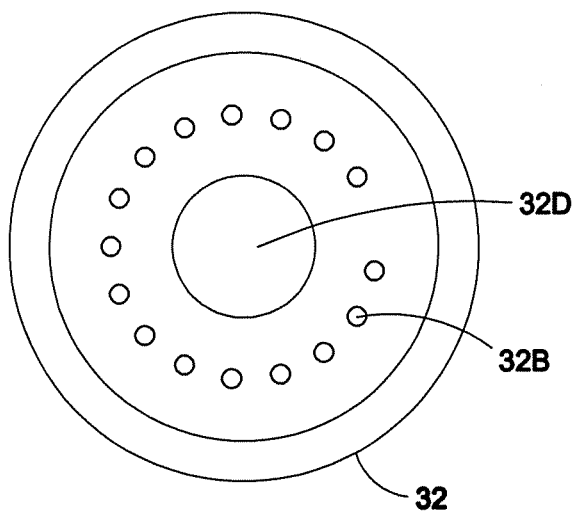
FIGS. 11a and 11b are top elevational and side cross sectional views of intermediate housing cap.
Figure 11B:
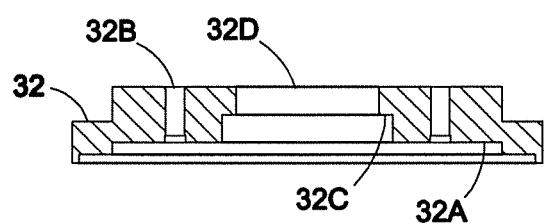
Figure 12A:
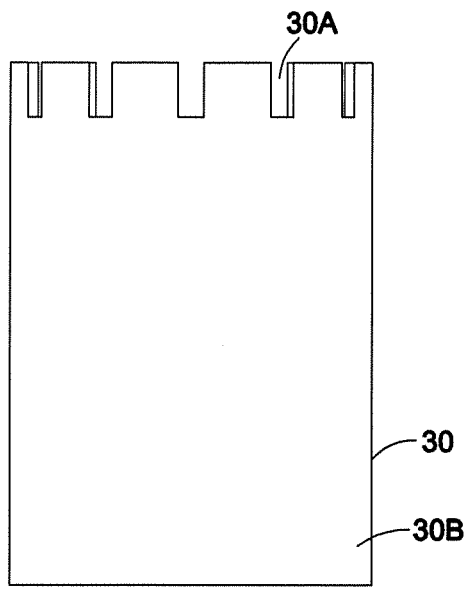
FIGS. 12a and 12b are side elevational and cross sectional views of intermediate housing.
Figure 12B:
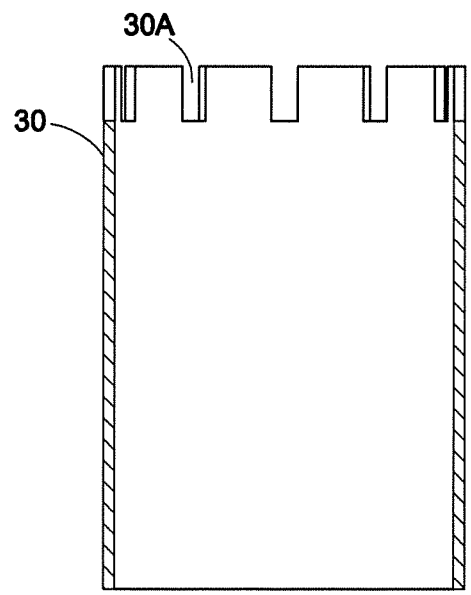

It may be seen now, with reference to FIGS. 11a, 11b, and the "Series 6" figures, how the structure of intermediate housing cap 32 operates to break a vacuum and prevent siphoning. Assuming a situation in which at least the lower portion of the valve is under water and a situation in which pressurized water source may become unpressurized, with any backflow developing when suction instead of pressure occurs at PWS, then it can be seen how vacuum breaker disc 33 would fall off of the recess 32a on underside of intermediate housing cap 32 to vent through vent holes 32b and break siphoning action. This will prevent water from the tank siphoning back through the valve and downward under the impetus of gravity through inlet channel member 18.

Figure 13A:
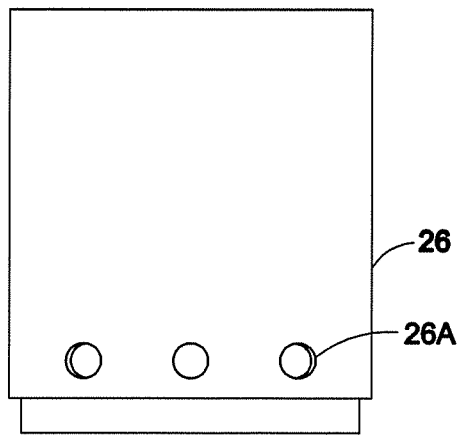
FIGS. 13a and 13b are side elevational and cross sectional views of inner housing lower member.
Figure 13B:
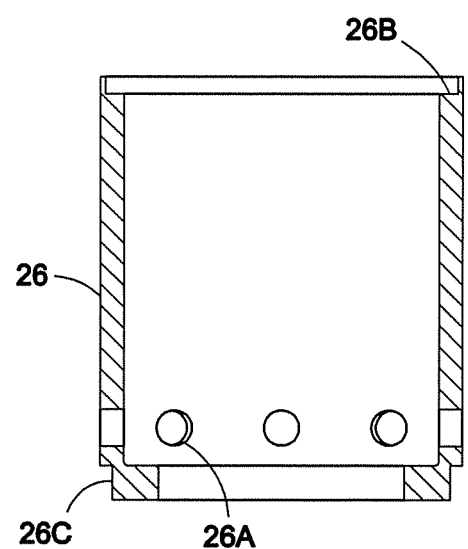

Turning now to FIGS. 13a and 13b, further details of inner housing lower member 26 may be seen, including the structure and location of holes 26a, upper recess 26b, and lower cutout 26c. Functional details of the operation of these elements in flow control may be seen with reference to other sections of these specifications.

Figure 15A:
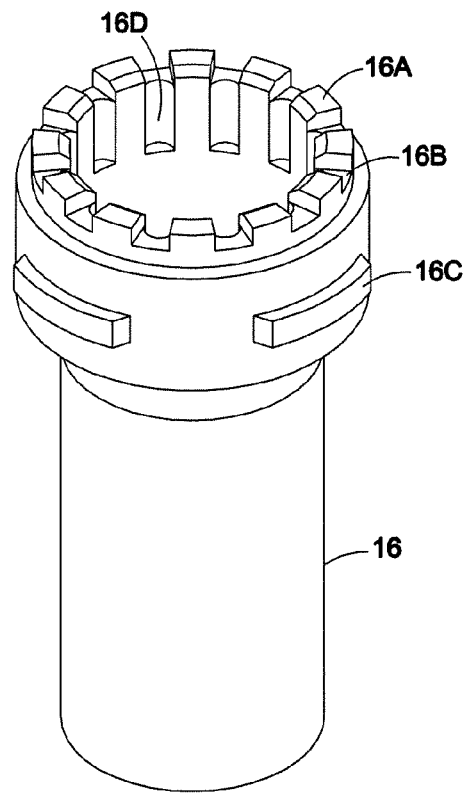
FIGS. 15a and 15b are side, upper perspective, and side cross sectional views of lower housing section.
Figure 15B:
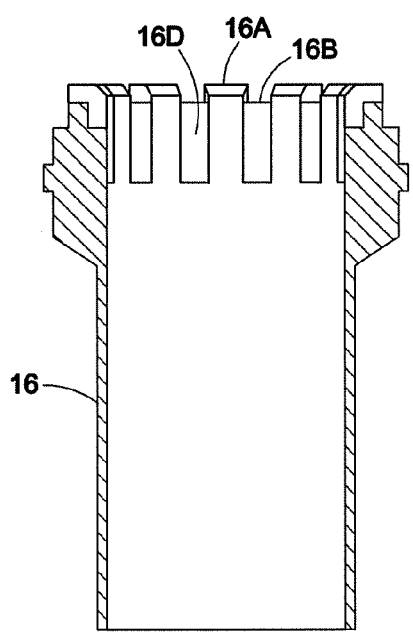

Turning now to FIGS. 14a and 14b, and with reference to any of the "Series 6" figures, and FIG. 3, for example, the structure and function of lower inlet channel member 18 may be provided. Upper end 18h is dimensioned to slideably engage, couple with, and positionally locate intermediate housing 30 (see Detail A, FIG. 6d). Threaded removed end 18b may be provided for threadably coupling a fitting on a support structure, such as a holding tank and/or threadably fitting a high pressure water hose line or other PWS. Channel 18c is provided to carry the main fluid flow MNF up past the lower main seal seat 18a and biasing member 44 as seen in FIG. 6d. The inner surface near the upper end 18c of channel is seen to be segmented into a series of lands 18d separated by bays 18e (see FIG. 6e). Lands 18d will engage the outer rim 46a of main seal 46 to stabilize it and the piston to which it is attached as it slides up and down as seen in "Series 6" figures. Bays 18e provide channeling for the water upward while lands 18d provide a surface across which main seal 46 can slide. Lip 18f will abut the top of legs 16a of lower housing section 16 (see FIG. 15a, and FIGS. 6d and 6e), while upper end 18h is slideably received into removed end 30b of housing 30 to help stabilize the assembly. It is seen how shoulder 18g engages bays legs 16a, so as to provide main fluid flow MNF through the bays or channels 16b and out the annulus between inlet channel member 18 and lower housing section 16 as seen in FIG. 6d, Detail B and FIG. 6e. Locking members 16c of lower housing section 16 are seen to engage upper housing section grooves 14a for receipt of locking members 16cthereinto as seen in FIG. 6d. Upper housing section 14 is also seen to be vented through vent holes 14b at a near or upper end thereof as seen in FIG. 6d. It is seen with reference to FIG. 6d, for example, how elements 14 and 16 couple to one another so as to "sandwich" the upper end of element 18 against the lower ends of elements 30 and 26 but in a manner that allows water to flow down the annulus inside the coupled 14 and 16.

Figure 16A:
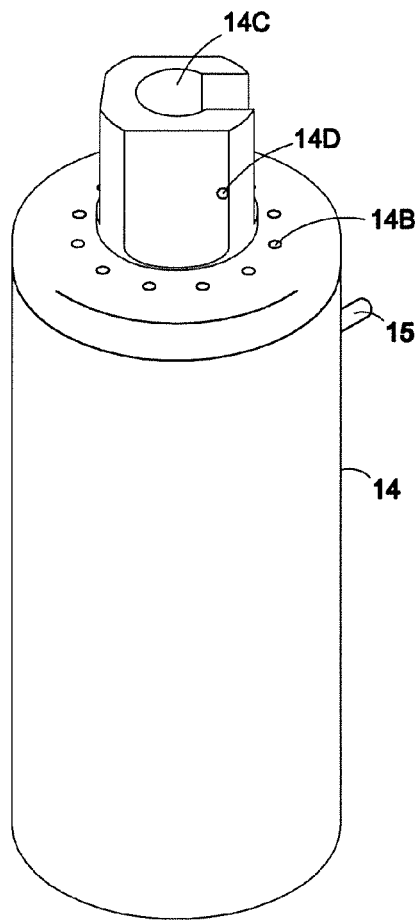
FIGS. 16a and 16b are side, upper perspective, and side cross sectional views of upper housing section.
Figure 16B:
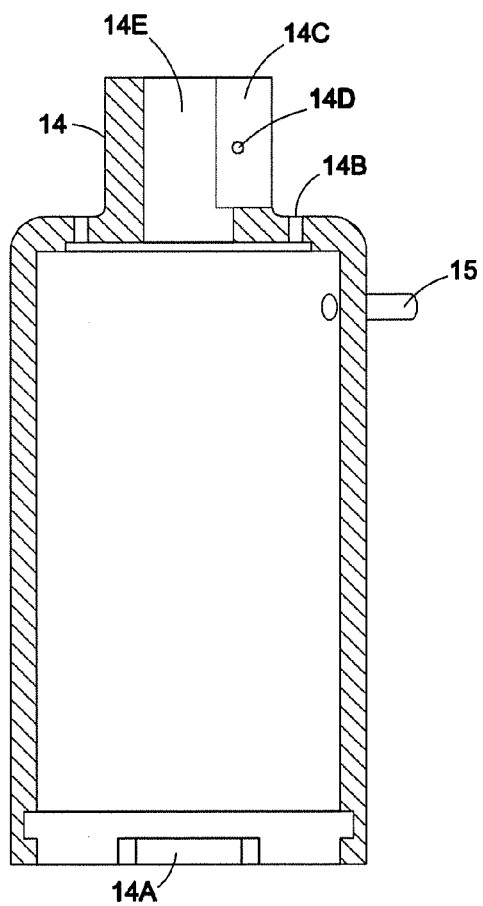

Both grooves 14a and vent holes 14b may also be seen with preference to FIGS. 16a and 16b. These figures show further details of upper housing section 14 including a lever housing 14c for receipt of lever end 56a thereinto as seen in FIG. 3. Lever housing 14c may also have pin channel 14d therethrough for receipt of pin 58 therethrough to pivotally hold lever end 56a in the lever housing 14c. Bore 14e is dimensioned to slideably receive plunger 50 (see FIG. 6d). An inlet screen 60 may be seated at the base or removed and of in the inlet channel member 18 as seen in FIG. 6c.

Operation and construction considerations of the metered fill valve biasing member 44 may be understood with reference to the following. Pressure range and response of the metered fill valve 10 are enhanced by the action of biasing member 44. Enhanced is defined as generally consistent operation at a lower pressure limit of PWS and accurate, repeatable volume metering at any pressure that may typically be found in a PWS. Biasing member 44 may consist of three parts: flap 44a, base 44c and leg 44b. The function of the annular leg 44b is to help center biasing member 44 in relation to the inner housing lower member 26 (see FIG. 6d, Detail A). It may or may not form a seal between the inner housing lower member 26 and the removed end 30b of the intermediate housing 30. Base 44c helps create a receiving area for upper end 18h and a stop or upper limit seat for the main seal 46 to limit the piston diaphragm assembly's 22 upward travel (see FIG. 6c). Flap 44a restricts the flow MNF of water past the piston sleeve 42 creating a higher pressure zone on bottom or upstream side of biasing member 44 (see Detail A, FIG. 6d). Biasing member 44 may be made from any suitable material, typically flexible, such as Sanoprene.® In construction of the biasing member 44, the stiffness of the material used as well as the angle of the flap of biasing member with respect to the outer side wall of the piston are among two of the variables that may be adjusted. Moreover, whatever the design and construction of biasing member 44 is, its placement with respect to the outer wall of the piston may also be considered. Typically, the removed end of flap 44a would be just touching the piston side wall when the valve assembly 10 is constructed. Thus, depending upon the stiffness of the material used, metered flow would occur, however, only with flow also occurring in the metered channel. However, the removed end of the flap may be a few mil either way, during construction of the valve. That is to say, the removed end of flap 44a may be set a few mil off or a few mil bent against (partial bias) the outer side wall. If the bias pressure is too high, either as a result of a stiff construction of the bias member itself, or too much pressure as set against the outer wall of the piston, or too great an angle, then operation of the valve may not occur at a low pressure insufficient to open an annulus past the biasing member. If the bias member flap is too far away from the wall of the piston, even without any bending, leaks may occur of water through the main water flow pathway, which leaks will occur without enough back pressure to generate metered flow in a timely fashion.

Figure 17A:
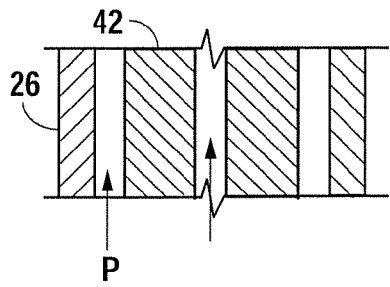
FIG. 17a illustrates prior art side elevational cutaway view of fluid flow through a main fluid flow pathway.
Figure 17B:
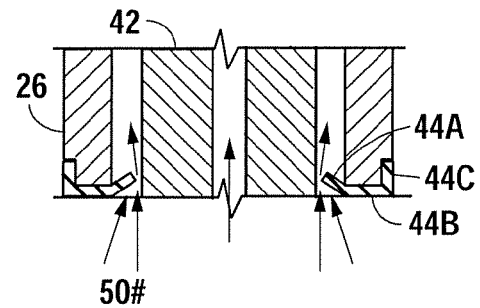
FIG. 17b is a side elevational cutaway view of fluid flow and pressure (arrows) against Applicant's biasing member.

Generally speaking, most metered flow valves have more obstruction in the meter flow pathway than a main flow pathway. This means that, when there is low pressure at the pressure water source PWS, there may be leakage through the main flow pathway, but not sufficient pressure to provide flow of metered water (and thus insufficient flow to shut the valve). This results in an almost constantly leaking valve. The use of biasing member 44 or similar structure to reduce the area of the main flow pathway, as is done here, when there is a drop in pressure may be referred to as "prioritizing" metered (timing) flow. That is to say, prioritizing metered flow such as is illustrated here means that structure may generate metered flow with or without sufficient pressure in the PWS to generate main fluid flow through the main fluid flow pathway. This is done with biasing member 44 or other suitable structure that closes down or reduces the area of a main fluid flow pathway responsive to a drop in upstream pressure water source pressure. At no pressure in the pressure water plus a small amount of water pressure in the pressure water source, the metering then may received metered water flow even without any main fluid flow. This is a result of bias member 44 responding to a drop in pressure. Reference to FIG. 17a illustrates an example of flow through prior art, "static" main fluid flow pathways. It will be seen with reference to FIG. 17b that as upstream pressure drops the biasing member responds by a greater degree of occluding the main fluid flow pathway and providing a greater pressure for metering water to flow up the metering channel than there would be without the greater degree of occluding.

This higher pressure zone generated by the action of biasing member 44 is especially useful if the pressurized water source PWS pressure is lower than about 30 PSI and typically is necessary if the PWS is below about 15 PSI, as it ensures a predictable, positive source of water for the MTF water flow thru the metering channel 40a and into the piston chamber PC. This higher pressure zone also acts in an "upward direction" on the bottom area of the piston core 40 and bottom area of seal 46 opposing the downward pressure acting on the top of the piston cap 38 and related elements. The ratio of exposed upper area of the piston diaphragm assembly 22 pushing down (as seen, for example, in FIG. 6d) on the piston to the smaller exposed area generating upward motion on the piston may be approximately 2 to 1. This ratio may be altered as necessary for other situations or desired results. Moreover, biasing member 44 is seen to be easily replaceable if other configurations are desired.

The area of the piston sleeve 42 and the pressure created by biasing member 44 also urge the upward movement of the piston diaphragm assembly 22 when pressing the reset plunger 50 relieves the opposing pressure on the top of the piston cap 38. As water pressure PWS increases flap 44a is forced further away from the piston sleeve 42, creating a larger annulus area for the MNF path (see Detail A, FIG. 6d). At any given PWS pressure, the amount the flap 44a moves and the subsequent increase in MNF path annulus are determined, in part, by the durometer of the elastomer (or other suitable material) of which the biasing member 44 may be constructed of and the thickness and height of flap 44a. Less flex of flap 44a creates more back pressure in the high pressure zone and a more flexible flap 44a creates less back pressure. An elastomer durometer on the Shore A scale of 70 with flap 44a width of about 0.063 inch and flap 44a height of about 0.185 in. produces satisfactory operation at PWS pressures of about 1/4 psi to 160 or more psi. Preferably, the resistance to flex of flat 44a increases, non-linearly, with respect to deflection pressure such that an increase in pressure of the deflection force of the water generates, non-linearly, a greater back pressure.

If lever 56 is not functioning properly and is held or jammed in the up position so that it is depressing the plunger 50 unseating the reset outlet meter pin seal 54, MTF water that is coming through the metering channel 40a flows through the reset outlet instead of filling and building pressure in the piston chamber PC, and moving the piston. Since no pressure is building in the piston chamber PC, the piston diaphragm assembly 22 is not urged downward and seal 46 remains seated against biasing member 44, preventing main water flow MNF (see FIG. 6c). At any time lever 56 is allowed to return to its lower position allowing the reset outlet meter pin seal 54 to seat, timing is initiated and the cycle allowing MNF proceeds to its completion.

Figure 18:
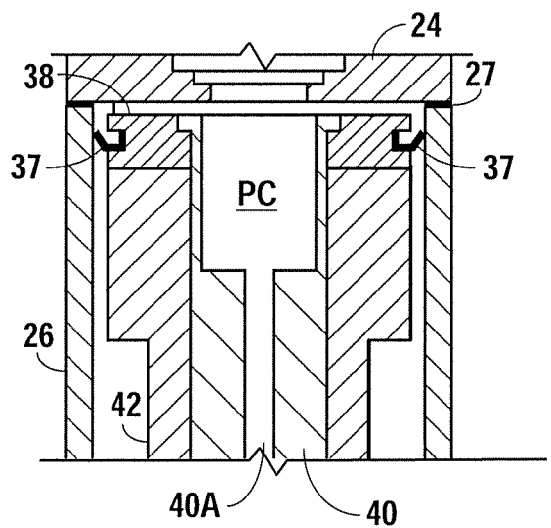
FIG. 18 illustrates a partial, side elevational cross-sectional view, of an alternate embodiment of a piston chamber using a seal instead of a diaphragm.

FIG. 18 illustrates that in place of a diaphragm 36, a seal 37 may be used. Seal 37 will seal between the piston and the inner side walls of inner housing lower member 26 as illustrated. FIG. 18 also illustrates that a gasket 27 may be used between the upper perimeter of element 26 and inner housing upper member 24 to ensure a fluid tight piston chamber when seal 37 is used. Moreover, in the claims, when the words "diaphragm assembly," "piston diaphragm assembly" or the like are used, it means that a diaphragm 36, a seal 37 or any other suitable member is intended within that term, which suitable member will allow for functional equivalent of elements 36/37.

Figure 19:
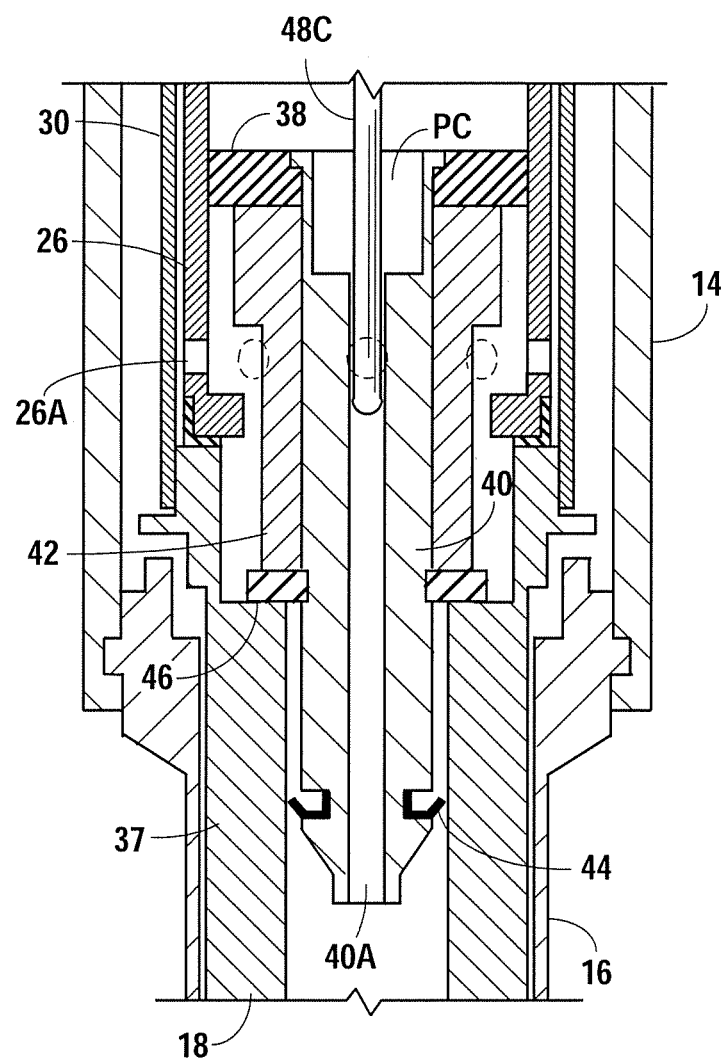
FIG. 19 illustrates a side elevational, cross-section of the valve assembly with an alternate embodiment of a biasing member.

Biasing member may also be configured as a male element or any other suitable structure. For example, FIG. 19 shows an alternate preferred embodiment of biasing member 44. Here, biasing member 44 is shown not only to be in a different configuration itself, but also at a different location in the main fluid flow channel. First, it is seen that flap 44a is not angled with respect to the side walls of inlet channel member 18, but instead is oriented about perpendicular to these walls (that is, not bent but straight). Moreover, it may, in an unpressurized situation, just touch the side walls or indeed maybe slightly against or slightly away from the side walls. FIG. 19 shows also that whatever configuration biasing member takes, it may be on or near the nose of the moving piston and below main seal 46, but still operating in the same fashion to occlude, at least partially, the main fluid flow pathway through valve assembly 10. As with the embodiments set forth above, such occlusion is a function of pressure, such that a pressure drop against the biasing member will cause a greater degree of occlusion of the main fluid flow pathway or a complete occlusion thereof. Also, a metering flow mechanism may be on the side of housing or any other suitable location. The terms "upper" and "lower" main seal seat are used herein to describe any structure on the valve assembly 10 engaging the piston seal 46 so as to substantially prevent a flow of non-metered water through valve assembly 10. The term "water" refers to any fluid.

Although the invention has been described with reference to a specific embodiment, this description is not meant to be construed in a limiting sense. On the contrary, various modifications of the disclosed embodiments will become apparent to those skilled in the art upon reference to the description of the invention. It is therefore contemplated that the appended claims will cover such modifications, alternatives, and equivalents that fall within the true spirit and scope of the invention.

The invention claimed is:

1. A fill valve comprising:
 a fluid flow assembly for receiving pressurized water and for having a main water flow pathway for carrying some portion of the pressurized water therethrough and a metered water flow pathway for carrying another, a metered flow portion, of the pressurized water therethrough and for expelling the two portions of pressurized water therefrom;
 a piston diaphragm assembly engaging the fluid flow assembly, the piston diaphragm assembly for receiving in and expelling from the metered flow portion of the pressurized water in a metered flow chamber thereof;
 a reset plunger meter pin assembly for fluidly engaging the fluid flow assembly and the piston diaphragm assembly to meter the flow of water into the metered flow chamber of the piston diaphragm assembly and for initiating a timed cycle of the piston diaphragm assembly, which timed cycle controls the water flowing through the fill valve; and
 further including means cooperating with the fluid flow assembly and the piston diaphragm assembly to increase the pressure of the metered flow portion to the piston diaphragm assembly, such increase as a function of the water pressure of the pressurized water source;
  wherein the means cooperating is a biasing member in the main water flow pathway of the fluid flow assembly.

2. The fill valve of claim 1, wherein the piston diaphragm assembly includes a piston having a metering channel therein, the piston moveable between an upper and lower position with respect to the fluid flow assembly wherein at least part of the main water flow pathway passes between the piston and the fluid flow assembly.

3. The fill valve of claim 1,
 wherein the fluid flow assembly includes an upper seat and a lower seat;
 wherein the piston diaphragm assembly includes a piston having a main seal thereon, the piston movable between a first position wherein the main seal is against the lower seat and a second position wherein the main seal is against the upper seat; and wherein the fluid flow assembly, the piston diaphragm assembly and the reset plunger meter pin assembly are configured to occlude the main water flow pathway when the piston is in either the first or second position and to open the main water flow pathway when the piston is between these two positions.

4. The fill valve of claim 1,
wherein the reset plunger meter pin assembly includes a seal moveable between an occluded and a non-occluded position in the metered water flow pathway and an adjustable metering pin having an elongated member;
wherein the piston diaphragm assembly includes a piston having a metering channel therein, the metering channel configured to receive within at least a portion of the elongated member of the metering pin therein so as to define a metered water flow pathway annulus between the pressurized water and the metered flow chamber;
wherein the fluid flow assembly, the piston diaphragm assembly, and the reset plunger meter pin assembly are configured such that the timed cycle is initiated by movement of the seal to the non-occluded position and the duration of the cycle is controlled, in part, by the extent to which the elongated member of the metering pin is received within the metering channel, wherein the fluid flow assembly further includes an upper seat and a lower seat;
wherein the piston of the piston diaphragm assembly includes further a main seal thereon, the piston movable between a first position wherein the main seal is against the lower seat and a second position wherein the main seal is against the upper seat; and
wherein the fluid flow assembly, the piston diaphragm assembly and the reset plunger meter pin assembly are configured to occlude the main water flow pathway when the piston is in the first or second position and to open the main water flow pathway when the piston is between these two positions.

5. The fill valve of claim 1 wherein means cooperating with the fluid flow assembly and the piston diaphragm assembly varies the area across the main water flow pathway through the fluid flow assembly as a function of pressure upstream thereof, such that the area of the main water flow pathway is less at a lower water pressure.

6. The fill valve of claim 5, wherein the piston diaphragm assembly includes a piston having a metering channel therein, the piston moveable between an upper and lower position with respect to the fluid flow assembly wherein at least part of the main water flow pathway passes between the piston and the fluid flow assembly.

7. The fill valve of claim 6, wherein the piston has a cylindrical elongated member having outer walls and wherein the fluid flow assembly has walls which, along with the cylindrical elongated member of the piston, define an annulus past which the elongated member of the piston passes, which annulus defines, at least in part, the main water flow pathway and wherein the biasing member includes a flexible skirt with a perimeter edge, the flexible skirt for flexibly opening in response to upstream water pressure changes, so as to change the area of the annulus.

8. The fill valve of claim 1 wherein the piston diaphragm assembly includes a piston having a metering channel therein, the piston moveable between an upper and lower position with respect to the fluid flow assembly wherein at least part of the main water flow pathway passes between the piston and the fluid flow assembly and wherein the biasing member varies the area of the main water flow pathway between the fluid flow assembly and the piston.

9. The fill valve of claim 7, wherein the piston has a cylindrical elongated member having outer walls and wherein the fluid flow assembly has walls which, along with the cylindrical elongated member of the piston, define an annulus past which the elongated member of the piston passes, which annulus defines, at least in part, the main water flow pathway and wherein the biasing member includes a flexible skirt with a perimeter edge, the flexible skirt for flexibly opening in response to upstream water pressure changes, so as to change the area of the annulus.

10. The fill valve of claim 1,
wherein the fluid flow assembly includes walls defining an upper seat and a lower seat, the upper and lower seats adjacent a portion of the main water flow pathway;
wherein the piston diaphragm assembly includes a piston having an elongated member, the elongated member having a metering channel therethrough, the metering channel fluidly coupled to the pressurized water and the metered flow chamber, the elongated member having a main seal near a removed end thereof; and
wherein the piston of the piston diaphragm assembly is moveable between a first position wherein the metered chamber is substantially full and wherein the main seal is sealing against the lower seat and a second position wherein the metered chamber is substantially empty and wherein the main seal is sealing against the upper seat, the two seated positions substantially occluding the main water flow pathway.

11. The fill valve of claim 10, wherein the upper and lower seats are adapted to determine the upper and lower position of the piston travel.

12. The fill valve of claim 10, wherein the piston and the fluid flow assembly are adapted to engage the main seal to provide means for stability and alignment to the piston as it moves between the first and second positions.

13. The fill valve of claim 1, wherein the reset plunger meter pin assembly includes a seal moveable between an occluded and a non-occluded position in the metered water flow pathway and an adjustable metering pin having an elongated member.

14. The fill valve of claim 13, wherein the piston diaphragm assembly includes a piston having a metering channel therein, the metering channel configured to receive within at least a portion of the elongated member of the metering pin therein so as to define a metered water flow pathway annulus between the pressurized water and the metered flow chamber.

15. The fill valve of claim 14, wherein the fluid flow assembly, the piston diaphragm assembly, and the reset plunger meter pin assembly are configured such that the timed cycle is initiated by movement of the seal to the non-occluded position and the duration of the cycle is controlled, in part, by the extent to which the elongated member of the metering pin is received within the metering channel of the piston.

16. A flush toilet for engaging a pressurized water source, the flush toilet comprising:
a tank having an inner volume capable of holding water therein, the tank having a tank outlet;
a bowl engaging the tank outlet;
a handle adapted to engage the tank;
a tank emptying valve engaging the tank outlet and the handle;
a fill valve for engaging the handle and for controlling water flow between the pressurized water source and at the tank, the fill valve comprising:
a fluid flow assembly for receiving pressurized water and having a main water flow pathway for carrying some portion of the pressurized water therethrough and a metered water flow pathway for carrying another, a metered flow portion, of water therethrough and for expelling the two portions of pressurized water therefrom;

a piston diaphragm assembly engaging the fluid flow assembly, the piston diaphragm assembly configured for receiving into and expelling from a metered flow chamber thereof, the metered flow portion of the pressurized water; and a reset plunger meter pin assembly for fluidly engaging the fluid flow assembly and the piston diaphragm assembly to meter the flow of water into the metered flow chamber of the piston diaphragm assembly and for initiating a timed cycle of the piston diaphragm assembly, which timed cycle controls the water flowing through the fill valve.

17. A flush toilet for engaging a pressurized water source, the flush toilet comprising:

a tank having an inner volume capable of holding water therein, the tank having a tank outlet;

a bowl engaging the tank outlet;

a handle adapted to engage the tank;

a tank emptying valve engaging the tank outlet and the handle;

a fill valve for engaging the handle, the fill valve for at least partially filling the tank comprising:

an inlet channel member having an upper end, lower end, outer walls, a lower inlet at the lower end thereof for engaging the pressurized water source and walls defining a lower piston seat near an upper end thereof;

a cylindrical outer housing having side walls and a vented top wall, the cylindrical outer housing engaging the inlet channel member;

a cylindrical intermediate housing having side walls and a vented cap, the cap having a cap perimeter, the cylindrical intermediate housing adapted to fixedly engage the inlet channel member so as to be substantially within the cylindrical outer housing and so as to provide an annulus between the two housings, the cylindrical intermediate housing having holes in the side walls thereof to provide fluid communication between the pressurized water source and the annulus between the cylindrical intermediate housing and the cylindrical outer housing;

a piston chamber assembly for fixedly engaging the cylindrical intermediate housing and the upper end of the inlet channel member, the piston chamber assembly having an inner housing with vented side walls, an upper member for engaging the vented sidewalls , and a lower end defining an upper piston seat, the piston chamber assembly rigidly engaging the cylindrical intermediate housing so as to define an annulus between the cylindrical intermediate housing and the inner housing, which annulus, through the vented side walls of the inner housing, may fluidly engage the inlet channel member, and a gap between an upper surface of the upper member of the inner housing and the cap of the intermediate housing;

the piston chamber assembly further including a movable piston assembly having a piston, the piston having an upper surface and an elongated portion with a metering channel therethrough, the piston with a main seal attached near a removed end of the elongated portion, the piston assembly including a flexible diaphragm, the flexible diaphragm for engaging the piston and the inner housing, the piston adapted to slide within the inner housing between the upper seat , where the diaphragm is collapsed, and the lower seat, where the diaphragm, the upper member of the inner housing, and the upper surface of the piston define a metered fill chamber and wherein the metering channel provides fluid communication between the inlet channel member and the metered fill chamber;

a reset plunger meter pin assembly having a plunger, the reset plunger meter pin assembly adapted to engage the handle so as to move responsive thereto, the reset plunger meter pin assembly with a metering pin adjustably engaged with the plunger, the reset plunger meter pin assembly for fixedly engaging the cylindrical outer housing, and the cylindrical intermediate housing and for moveably engaging the upper member of inner housing, the reset plunger meter pin assembly including a seal fixed around the metering pin and the plunger, the plunger moveable between a first or sealed position, for seating the seal against the upper member of the inner housing, and a second or unsealed position, the second or unseated position providing fluid communication through the upper member of the inner housing to the annulus between the inner housing and the intermediate housing and between the intermediate housing and the outer housing, the metering pin extending into the metered fill chamber and having a nose for extending at least partially into the metering channel of the piston, so as to define a metering annulus between the metering channel and the nose; and wherein the piston is movable between a lower position wherein the main seal is engaged with the lower seat and an upper position where the main seal is engaged with the upper seat of the inner housing member, such piston movement responsive to movement of the reset plunger meter pin assembly between the sealed and unsealed position.

18. The flush toilet of claim 17, further comprising a biasing member, proximal either the upper seat or the lower seat and adjacent the elongated portion of the piston, configured to control the flow of water to the metered flow chamber.

19. The flush toilet of claim 17 wherein the seal of the reset plunger meter pin assembly is self-sealing.

20. The flush toilet of claim 17 further including means engaging the elongated portion of the piston to provide stability and alignment of the piston as it moves between the first and second positions.

21. The flush toilet of claim 17 wherein the meter pin is stationery as the piston moves between the first and second position.

22. The flush toilet of claim 17, further comprising a biasing member, proximal either the upper seat or the lower seat and adjacent the elongated portion of the piston, to control the flow of water to the metered flow chamber;

further including means engaging the elongated portion of the piston to provide stability and alignment of the piston as it moves between the first and second positions;

wherein the seal of the reset plunger metered pin assembly is self-sealing; and wherein the meter pin is stationery as the piston moves between the first and second position.

* * * * *